United States Patent [19]

Okada et al.

[11] Patent Number: 4,809,361
[45] Date of Patent: Feb. 28, 1989

[54] OPTICAL COMPOSITE TRANSCEIVER

[75] Inventors: Akihiro Okada; Takashi Matsuda, both of Kawasaki, Japan

[73] Assignee: Fujitsu Limited, Kawasaki, Japan

[21] Appl. No.: 929,797

[22] Filed: Nov. 13, 1986

[30] Foreign Application Priority Data

Nov. 13, 1985 [JP] Japan ............................... 60-254016

[51] Int. Cl.$^4$ ............................................. H04B 9/00
[52] U.S. Cl. .......................................... 455/606; 370/1; 455/612
[58] Field of Search ............... 455/607, 606, 612, 617, 455/618, 619; 375/7; 370/4, 1

[56] References Cited

U.S. PATENT DOCUMENTS

| | | | |
|---|---|---|---|
| 4,481,626 | 11/1984 | Boggs et al. | 370/94 |
| 4,562,582 | 12/1985 | Tokura et al. | 455/608 |

OTHER PUBLICATIONS

IEEE Standards for Local Area Networks: Carrier Sense Multiple Access with Collison Detection (CSMA/CD) Access.

Method and Physical Layer Specifications, IEEE Computer Society, Dec. 1984, pp. 139 and 142.

*Primary Examiner*—Robert L. Griffin
*Assistant Examiner*—L. Van Beek
*Attorney, Agent, or Firm*—Staas & Halsey

[57] ABSTRACT

An optical composite transceiver for a bus type local area network (LAN) system using a U-shaped or S-shaped optical fiber cable as a one-way transmission line, and using a carrier sense multiple access/collision detection (CSMA/CD) method and a half duplex communication method, the optical composite transceiver includes: optical couplers for sending and branching data to and from the optical fiber cable; an electric-to-optical converter and an optical-to-electric converter for converting an electric signal to an optical signal and an optical signal to an electric signal; an inner coaxial cable provided within the optical composite transceiver; a plurality of coaxial transceivers connected to the inner coaxial cable; and a control unit having access functions for sending and receiving data, and a collision detection function, and operatively connected to one of the inner coaxial transceivers.

3 Claims, 12 Drawing Sheets

OPTICAL COMPOSITE TRANSCEIVER

BACKGROUND OF THE INVENTION

1. Field of the Invention

The present invention relates to an optical composite transceiver for a local area network (hereinafter, LAN) system using an optical fiber cable.

2. Description of the Related Art

Conventionally, the LAN system is classified into three types, i.e., a bus type, a ring type, and a star type, according to the connection of interfaces in the network. The present invention relates to the bus type LAN system. The LAN system has been also classified into three types based on the transmission media used for the network, i.e., twisted pair cable, coaxial cable, and optical fiber cable types. The present invention relates to a transceiver for optical fiber cable, but can be connected to a conventional transceiver for coaxial cable.

Moreover, a carrier sense multiple access/collision detection (below, CSMA/CD) method is usually employed as the transmission media access method in the LAN system, and this CSMA/CD method has three states regarding the transmission in the network, i.e., "idle" state, "busy" state, and "collision" state.

In this method, a station at which a "request to send" has been generated, first supervises a common transmission line (path) and then determines whether or not another station is transmitting. This is performed by "carrier sensing". When the common path is in a "busy" state, the station waits for transmission of the data frame, but when the common path is in an "idle" state, the station transmits the frame to the common path.

In this case, since a propagation delay time occurs at the transmission of the frame, when the transmission is performed only by a detection of an "idle" state at the common path in each station, collisions of the frame occur with a plurality of stations simultaneously transmit the frame to the common path when each station detects an "idle" state at the common path. Accordingly, the normal frame can not be transmitted to the other party.

When these collision occur in the common path, in order to shorten the time for which the common path is occupied by the collision frame, each station looks for an existence of a collision when the data is under transmission. When a collision is detected, the transmission is stopped, and after waiting for a predetermined time, the same procedure is repeated in order to retransmit the frame.

The IEEE regulation 802.3 is one of the standards defined and recommended by the IEEE Standard Board for the LAN system. This standard defines various elements such as, (1) physical conditions, (2) electrical conditions, (3) communication means, and (4) network structure for the LAN system using a coaxial cable. That is, when a coaxial cable is used as the common path, the transceiver must comply with the IEEE regulation 802.3 for the LAN system.

SUMMARY OF THE INVENTION

The primary object of the present invention is to provide an optical composite transceiver for the bus type LAN system using an optical fiber cable.

Another object of the present invention is to provide an optical composite transceiver which can be applied to a conventional transceiver for a coaxial cable in compliance with the IEEE regulation 802.3.

Still another object of the present invention is to provide an optical composite transceiver which can be connected to a plurality of conventional transceivers for a coaxial cable.

In accordance with the present invention, there is provided an optical composite transceiver for a bus type local area network (LAN) system using a U-shaped or S-shaped optical fiber cable as a one-way transmission line and using a carrier sense multiple access/collision detection (CSMA/CD) method and a half duplex communication method, the optical composite transceiver including: optical couplers for sending and branching the data to and from the optical fiber cable; an electric-to-optical converter and an optical-to-electric converter for converting an electric signal to an optical signal and an optical signal to an electric signal; an inner coaxial cable provided within the optical composite transceiver; a plurality of coaxial transceivers connected to the inner coaxial cable; and a control unit having access functions for sending and receiving data, and a collision detection function, and operatively connected to one of the inner coaxial transceivers; wherein a collision of frame data on the inner coaxial cable is detected by each of the coaxial transceivers, and a collision of the frame data on the optical fiber cable is detected by the control unit.

In accordance with the present invention, it is possible to considerably reduce the cost of the LAN system because a plurality of coaxial transceivers and terminals can be connected to one optical composite transceiver through an inner coaxial cable, and moreover, it is possible to utilize a conventional coaxial transceiver and terminal complying with IEEE regulation 802.3.

DESCRIPTION OF THE PREFERRED EMBODIMENTS

Before describing the preferred embodiments, explanations will be given of a conventional transceiver for a coaxial cable (hereinafter, coaxial transceiver) and a conventional transceiver for an optical fiber cable (hereinafter, optical transceiver).

Figure 1:
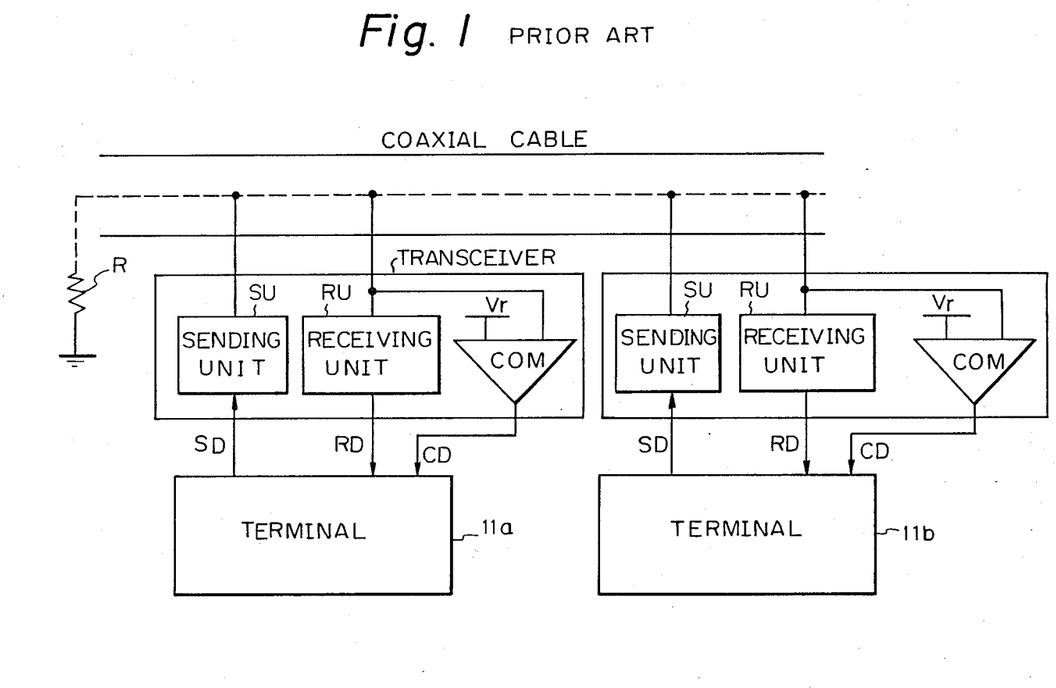
FIG. 1 is a schematic block diagram of a conventional transceiver and terminal for a coaxial cable in the LAN system.

Referring to FIG. 1, this LAN system is a "bus type" and a coaxial cable is used as the transmission line. In this case, the data transmission is two-way. Each coaxial transceiver is basically constituted by a sending unit SU for transmitting a sending data SD to the coaxial cable, a receiving unit RU for receiving the data RD from the coaxial cable, and a comparator COM for comparing the line potential with the reference potential $V_r$ in order to detect a collision of the frame. In the transceiver, which complies with IEEE regulation 802.3, the sending data SD can be supervised by the receiving data RD, and a collision of the frame detected by a change in the potential of the coaxial cable in comparison with the reference potential, in the comparator COM. Accordingly, the comparator COM functions as a collision detection unit. The sending data SD from the sending unit SU is quickly detected by the receiving unit RU, which then checks whether or not the sending data SD coincides with the receiving data RD. The delay time between the sending data SD and the receiving data RD is set within the time defined by IEEE regulation 802.3. In general, this time difference is defined as within several micro seconds, in IEEE regulation 802.3. When the line potential is lower than the reference potential, a collision detection signal CD is output from the comparator COM.

The terminal $11a$, $11b$ complying with the IEEE regulation 802.3 is connected to the coaxial transceiver by the attachment-unit-interface cable (AUI cable), which is constituted by a twisted pair cable.

Figure 2:
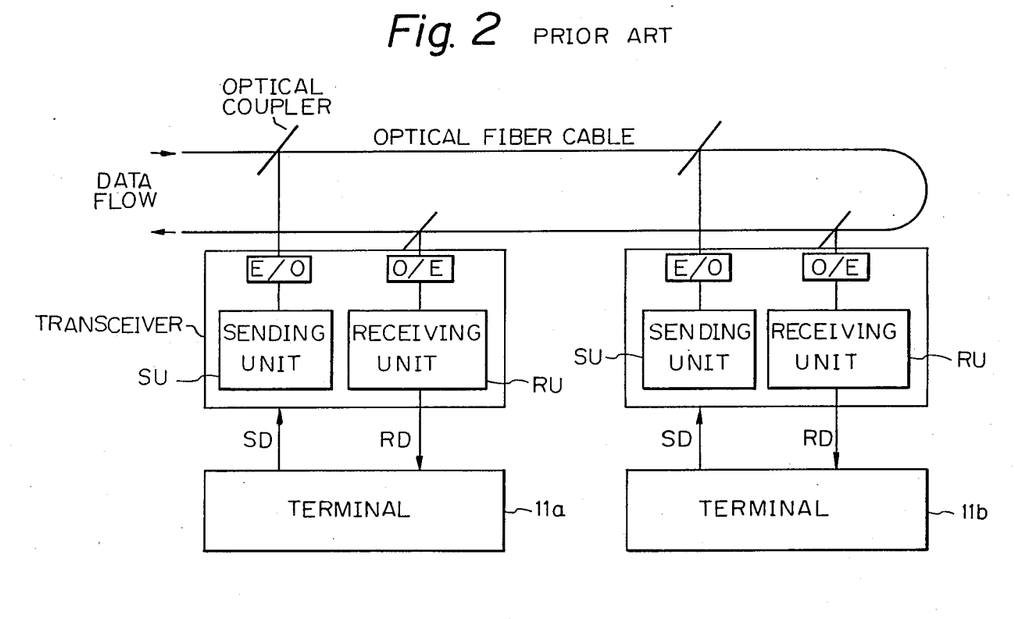
FIG. 2 is a schematic block diagram of a conventional transceiver and terminal for an optical fiber cable in the LAN system.

Referring to FIG. 2, this shows a LAN system in which an optical fiber cable is used as the transmission line. In this case, optical couplers and electric/optical converters (E/O, O/E) are necessary for data transmission and reception. In this LAN system, the data transmission is one way, over a U-shaped optical fiber cable. The optical transceiver is basically constituted by E/O and O/E converters, a sending unit SU, and a receiving unit RU. The sending data SD from the E/O converter is received by the receiving unit through the O/E converter. But, the delay time between the sending data SD and the receiving data RD is very long (approximately, ten times the delay time for the coaxial transceiver). That is, several tens of microseconds must elapse before reception. Accordingly, the conventional coaxial transceiver complying with IEEE regulation 802.3 can not be used as is in the LAN system using an optical fiber cable, because of this large delay time.

Figure 3:
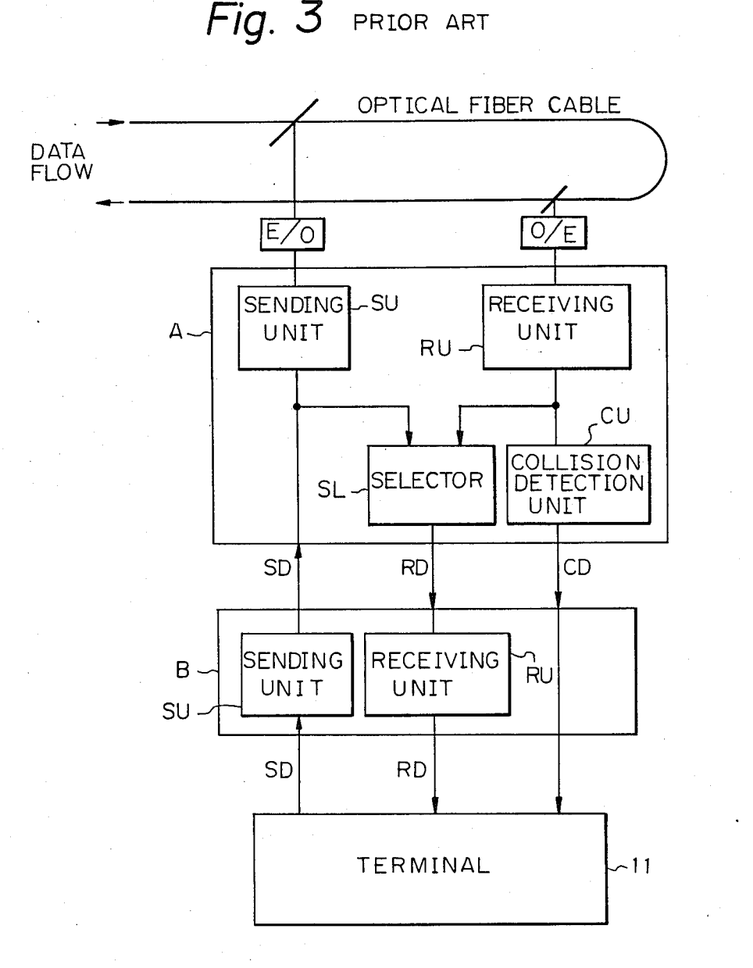
FIG. 3 is a schematic block diagram of a conventional optical transceiver for an optical fiber cable in the LAN system.

Referring to FIG. 3, this LAN system disclosed in U.S. Ser. No. 758,787, filed on July 25, 1985, Akihiro Okada et al, also uses the optical fiber cable. The optical composite transceiver A can be connected to the conventional coaxial transceiver B as shown in FIG. 1. This optical composite transceiver A is also connected to a conventional terminal 11 through a conventional coaxial transceiver B, which also complies with IEEE regulation 802.3. The optical composite transceiver A is basically constituted by a sending unit SU, a receiving unit RU, a sending data and receiving data selector SL, and a collision detection unit CU. When the collision of the frame at the optical fiber cable occurs, this collision is detected by a known "Manchester code rule" in the collision detection unit, and a collision detection signal CD is sent to the terminal through the coaxial transceiver B. This type of the optical composite transceiver A can compensate for the large delay time between the sending data and the receiving data because the sending data SD is returned through the selector SL. But, in this optical composite transceiver, it is necessary to provide one optical composite transceiver per each conventional coaxial transceiver B and terminal 11.

An improved optical composite transceiver according to an embodiment of the present invention will be explained in detail hereinafter.

Figures 4, 4A:
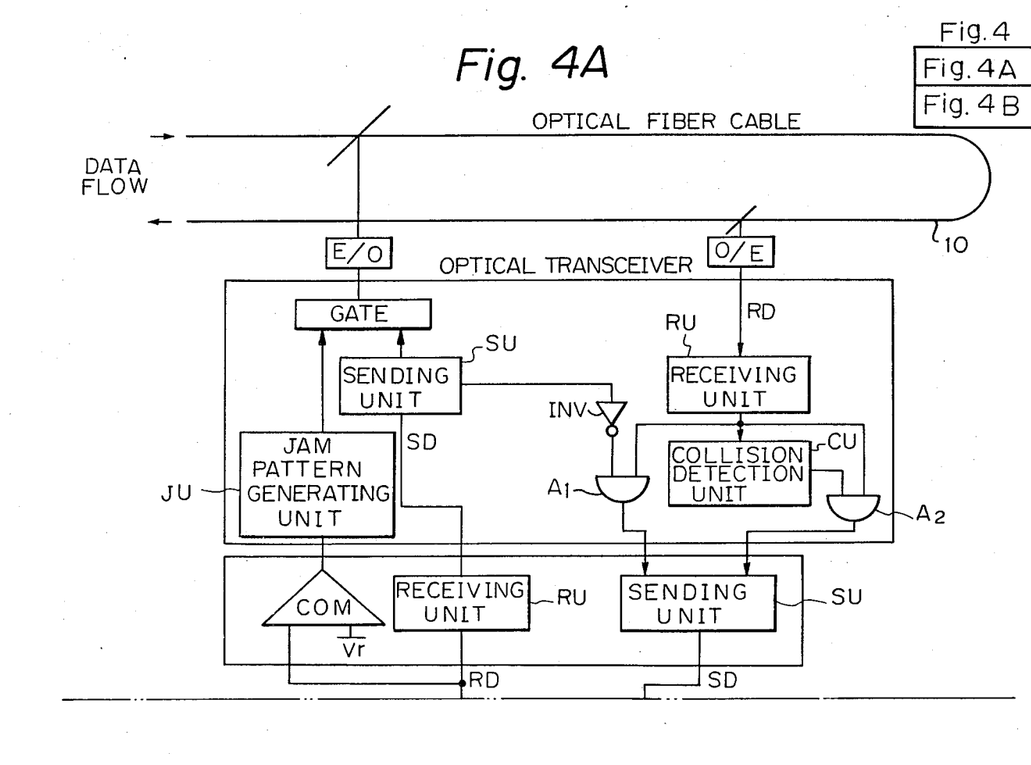
FIGS. 4A and 4B are schematic block diagrams of an optical composite transceiver according to an embodiment of the present invention for an optical fiber cable in the LAN system.
Figure 4B:
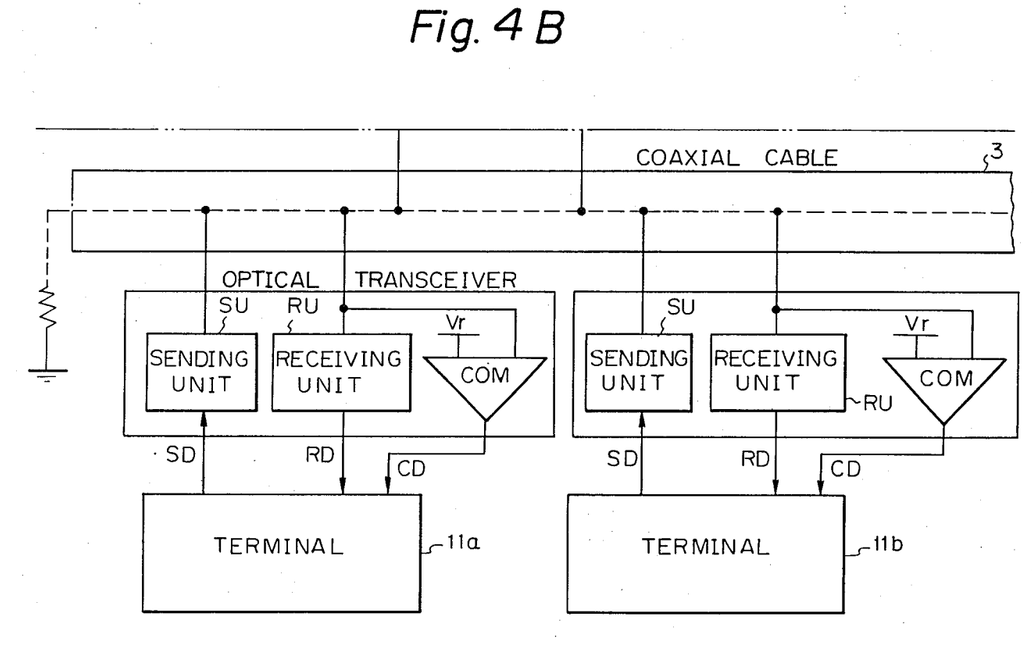

Referring to FIGS. 4A and 4B, an optical composite transceiver is used for a bus type LAN system using a U-shaped optical fiber cable as a one-way transmission line. This LAN system also employs a half duplex method as the communication method, and the CSMA/CD method explained above. The optical composite transceiver according to the present invention is basically constituted by a optical transceiver unit 110, an inner coaxial cable 3, and a plurality of coaxial transceivers.

In this case, each coaxial transceiver complies with IEEE regulation 802.3. The optical transceiver unit is basically constituted by a sending unit SU, a receiving unit RU, a collision detection unit CU, and a jam pattern generating unit JU.

The data SD transmitted from the terminal 11a is sent to the coaxial cable 3 through the sending unit SU in the coaxial transceiver. This data SD is also sent to the optical transceiver through the coaxial transceiver. Simultaneously, this data is returned to the terminal 11a through the receiving unit RU. Each coaxial transceiver determines whether or not a collision has occurred in the coaxial cable 3 by comparing the potential of the coaxial cable 3 with the reference potential Vr. When a collision on the coaxial cable is detected, the jam pattern is generated and sent to the optical fiber cable 10. When a collision is not detected, the sending data SD is sent to the optical fiber cable 10.

The reception of the data from the optical fiber cable 10 is performed by the receiving unit RU and the AND gate $A_1$ in the optical transceiver unit, and the AND gate $A_1$ is closed when the data is transmitted. This is to prevent the receiving data RD from colliding with the sending data SD from the terminal when the data RD is sent to the coaxial cable 3.

When a collision has occurred on the optical fiber cable 10, this collision is detected by the collision detection unit CU and the AND gate $A_2$ is opened, then the receiving data RD is sent to the coaxial cable 3. In this case, since the collision has occurred on the coaxial cable 3, this collision is detected by the coaxial transceiver and the terminal 11 is informed, and thus the terminal 11 can detect the collision on the optical fiber cable 10.

The optical transceiver unit carries out a one-way transmission between the optical fiber cable 10 and the coaxial cable 3 when the collision has not occurred on the optical fiber cable 10 and the coaxial cable 3, and the optical transceiver unit carries out a two-way transmission when the collision has occurred on the optical fiber cable 3.

A more detailed explanations of this system will be given with reference to FIGS. 5 and 6.

Figure 5:
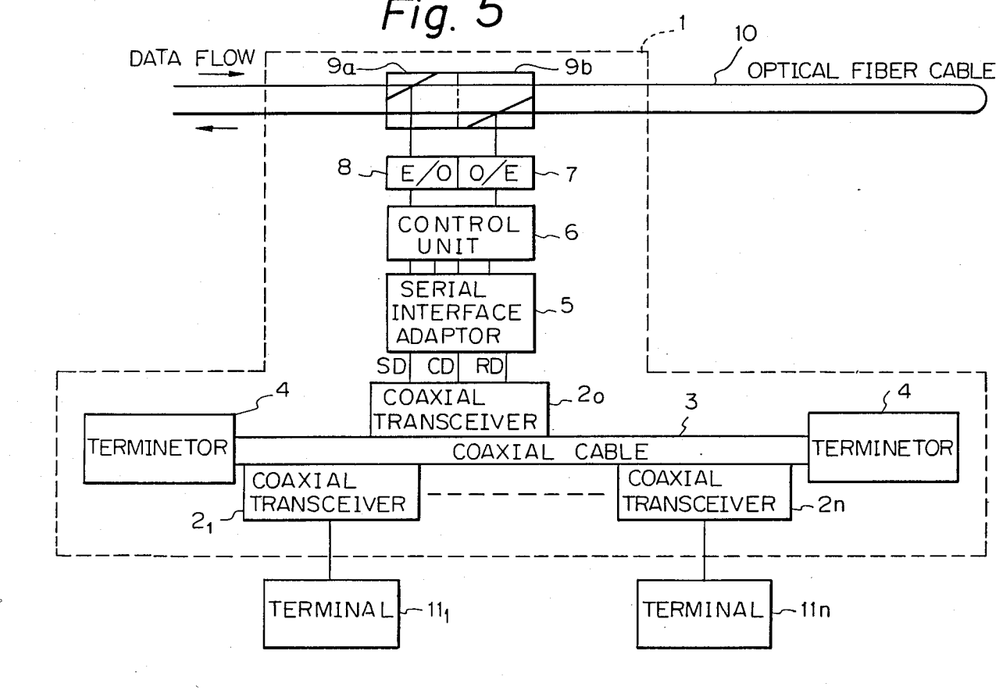
FIG. 5 is a detailed block diagram of the optical composite transceiver shown in FIGS. 4A and 4B.

Referring to FIG. 5, the optical composite transceiver 1 is constituted by a plurality of coaxial transceivers ($2_0$ to $2_n$) connected to the inner coaxial cable 3 provided within the optical composite transceiver 1. The length of the coaxial cable 3 is approximately 20 cm and terminators 4 are provided at both ends of the coaxial cable 3. Two optical couplers 9a and 9b are provided for the optical fiber cable 10. Optical coupler 9b is connected to the optical/electrical conversion unit 7 and optical coupler 9a is connected to the electrical/optical conversion unit 8. Further, a control unit 6 and a serial interface adaptor 5 are provided for collision control. The serial interface adaptor 5 is connected to one of the coaxial transceivers, for example, the coaxial transceiver $2_0$. In the present invention, each of the terminals $11_l$ to $11_n$, which are compatible with a LAN system using a coaxial cable, are connected to each of the coaxial transceivers $2_l$ to $2_n$ respectively. Each of the coaxial transceivers $2_l$ to $2_n$ complies with IEEE regulation 802.3. Accordingly, collision detection on the coaxial cable 3 can be performed based on the same method and timing as the conventional detection method shown in FIG. 1.

The sending data SD from the terminals $11_1$ to $11_n$ is sent to the optical fiber cable 10 along the following route, i.e., the coaxial transceiver $2_l$ to $2_n$→the coaxial cable 3→the coaxial transceiver $2_0$→the serial interface adaptor 5→the control unit 6→the E/O converter 8→the optical coupler 9a→the optical fiber cable 10. The optical signal on the optical fiber cable 10 is branched by the optical coupler 9b, and after being converted to an electric signal, is sent to the terminal by reversing the above route. In the present invention, collision of the frame data on the optical fiber cable 10 is detected by the control unit 6, and collision of the frame data on the coaxial cable is detected by each of the coaxial transceivers $2_l$ to $2_n$.

By using the optical composite transceiver according to the present invention, it is possible to use coaxial transceivers and terminals developed for the coaxial cable and complying with IEEE regulation 802.3 in the LAN system for the optical fiber cable.

Briefly, the features of the present invention include:

(1) The inner coaxial cable is provided within the optical composite transceiver;

(2) A plurality of coaxial transceivers (interfaces) between the inner coaxial cable and the terminal comply with IEEE regulation 802.3;

(3) The half duplex method is used to obtain access to the optical fiber cable;

(4) Collision on the optical fiber cable is detected by the control unit; and (5) Collision on the inner coaxial cable is mainly detected by each coaxial transceiver by the conventional method as explained above.

Figure 6:
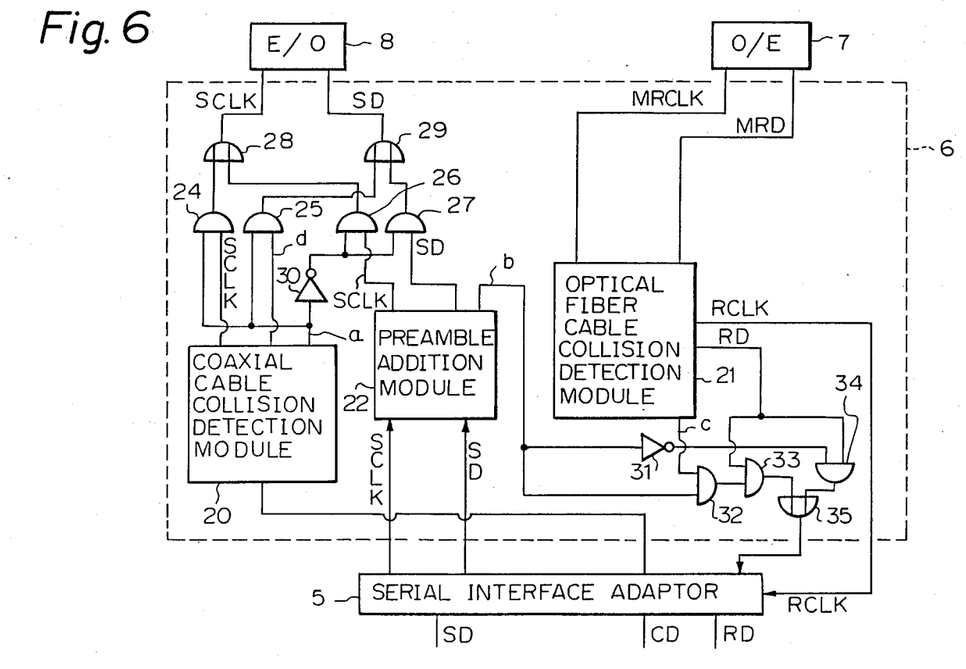
FIG. 6 is a detailed circuit diagram of a control unit shown in FIG. 5.

Referring to FIG. 6, reference number 20 represents a coaxial cable collision detection module, 21 an optical fiber cable collision detection module, 22 a preamble addition module, 24 to 27 and 32 to 34 AND gates, 28, 29, and 35 OR gates, and 30, 31 inverters. "SCLK" represents a sending clock signal, "RCLK" a receiving clock signal, "MRCLK" a receiving clock signal based on the Manchester code rule, and "MRD" a receiving data based on the Manchester code rule.

The coaxial cable collision detection module 20 is used to detect collision on the coaxial cable 3 shown in FIGS. 4 and 5. The optical fiber cable collision detection module 21 is used to detect collision on the optical fiber cable. The preamble addition module 22 is used to add a preamble pattern to the data. The coaxial cable collision detection module 20 detects the collision by the collision detection signal CD from the adaptor 5 and generates a jam pattern. The optical fiber cable collision detection module 21 generates a collision detection signal and sends the receiving data RD from the O/E 7 to the AND gates 33 and 34. Both collision detection modules 20 and 21 have collision detection functions complying with the known Manchester code rule. As is well-known, the Manchester code rule is a method for judging the existence of a collision in such a way that an "0" signal is converted to a "10" signal, and a "1" signal to an "01" signal, then the data is sent to the receiving side in such a way that the same level is not continued for more than three bits, and thus this bit state is detected by the receiving side.

The data from the coaxial transceivers $2_l$ to $2_n$ is sent to the coaxial transceiver $2_0$ through the coaxial cable 3. The coaxial transceiver $2_0$ sends the data to the serial interface adaptor 5. In the serial interface adaptor 5, the sending data SD is decoded and the sending clock SCLK is extracted. The sending data SD and the sending clock SCLK are then input to the preamble addition module 22. In the preamble addition module 22, the known preamble bits, necessary when the clock signal is extracted, are added to the head of the data, and new sending data SD is sent to the optical fiber cable 10 through the AND gate 27, the OR gate 29, and the E/O converter 8.

In the sending mode, since the signal line b becomes high (H) level, and this "H" level is inverted by the inverter 31, the AND gate is closed and the returning data RD from the optical fiber cable 10 is inhibited, thus avoiding a collision on the coaxial cable 3. At this time, if a collision on the optical fiber cable 10 does not exist, the signal line c becomes low (L) level, and thus the AND gates 32 and 33 are closed.

When a collision on the optical fiber cable 10 is detected by the module 21 during the sending mode, the signal line c becomes "H" level, and the AND gates 32 and 33 are opened. Accordingly, the inhibit of the returning data RD is released and the data RD is sent to the coaxial cable 3. This disturbs the electric potential on the coaxial cable 3, and this disturbed potential is detected by the comparator COM, which then informs the terminal of the occurrence of a collision.

When not sending data SD, the signal line b becomes "L" level, and the AND gate 34 is opened. Accordingly, the receiving data RD is sent to the coaxial cable 3 through the OR gate 35.

When a collision on the coaxial cable is detected by the module 20, the signal line a becomes "H" level, and the AND gates 26 and 27 are closed through the inverter 30, and thus the sending data SD and the sending clock signal SCLK are inhibited. But the AND gates 24 and 25 are opened, the collision indicating signal d is sent to the optical fiber cable 10.

Figure 7:
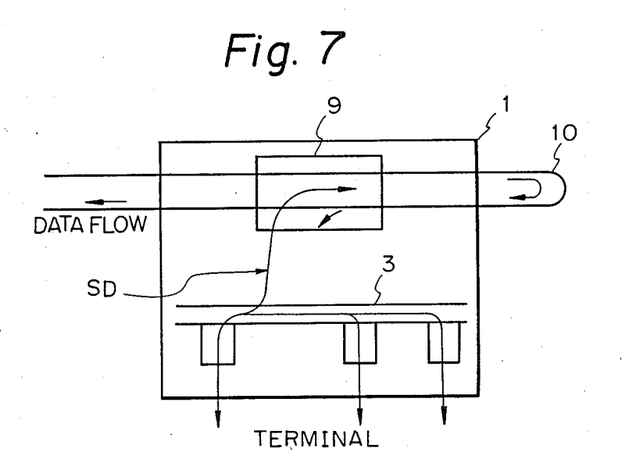
FIGS. 7 to 10 are views for explaining the data flow of sending data, receiving data, and collision data signals.
Figure 8:
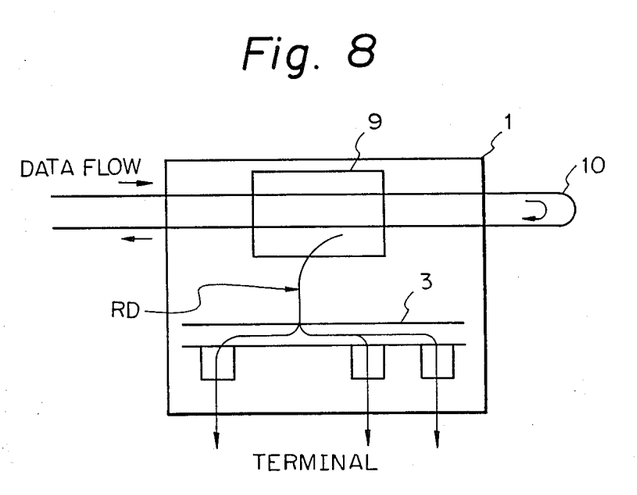
Figure 9:
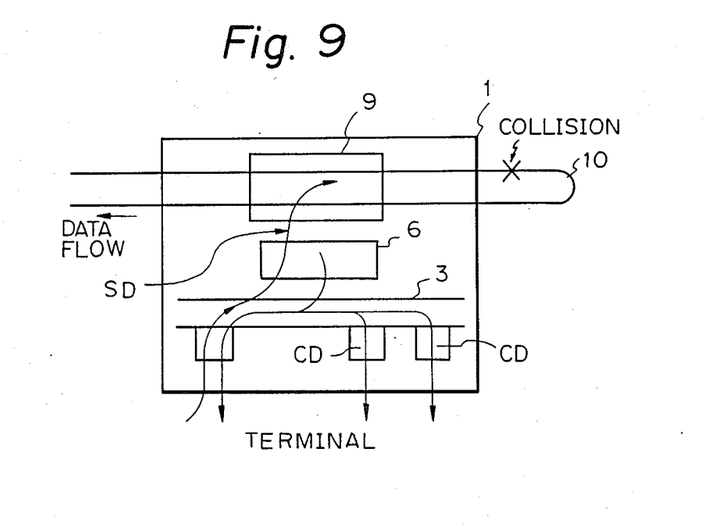

Referring to FIGS. 7 to 10, these figures are views for explaining the data flow indicated by arrow marks in the optical composite transceiver of FIG. 6. FIG. 7 shows a normal sending state of the sending data SD, and FIG. 8 shows a normal receiving state of the receiving data RD. FIG. 9 shows a collision state on the optical fiber cable 10 (indicated by an "X"). The collision state is detected by the control unit 6 and the collision detection signal CD is sent to each of the terminals through the coaxial cable 3 and each of the coaxial transceivers.

Figure 10:
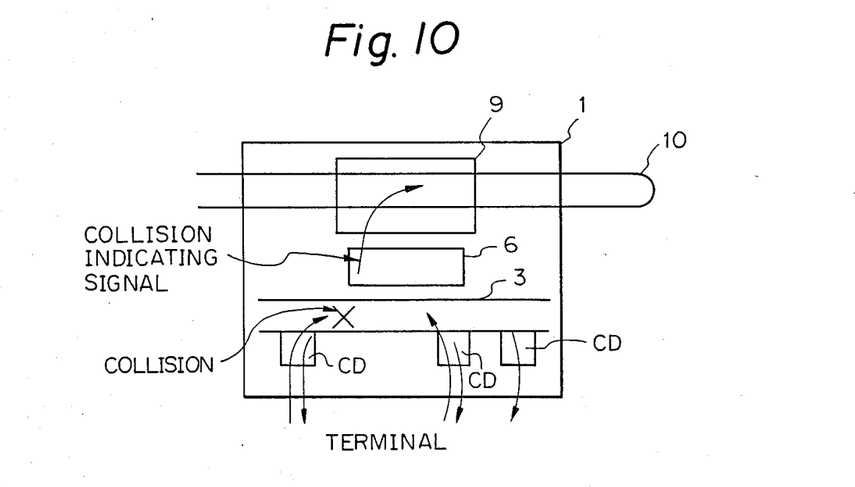

FIG. 10 shows the collision state on the coaxial cable 3 (indicated by an "X"). The collision state is detected by each of the coaxial transceivers and the collision detection signal CD is sent to each of the terminals.

Figure 11:
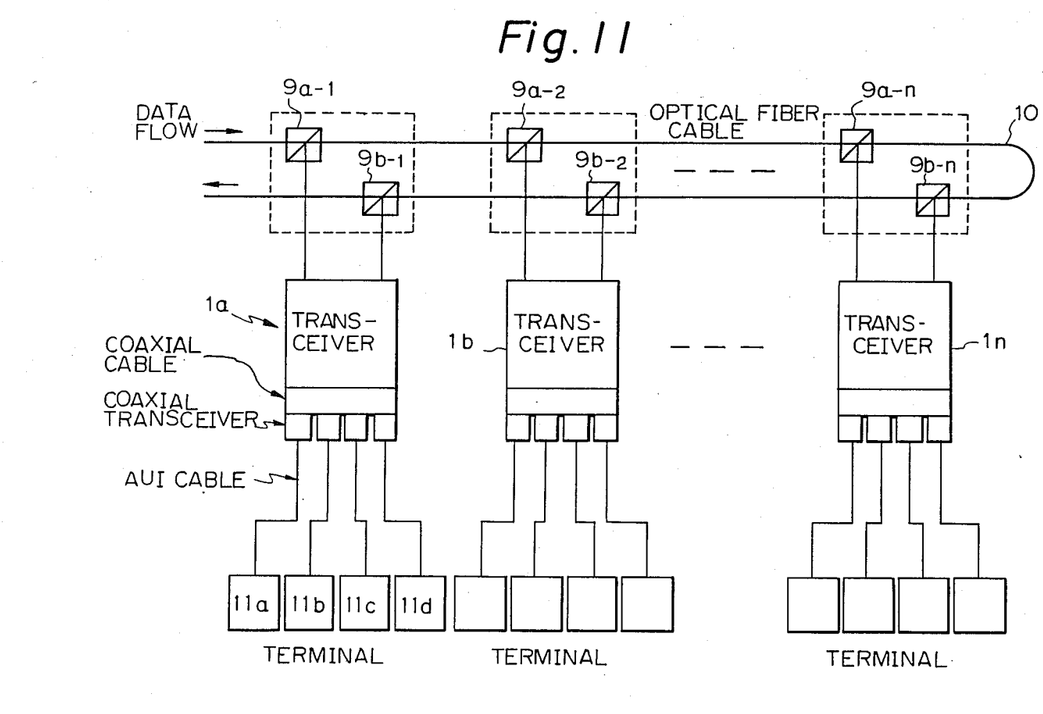
FIG. 11 is a schematic block diagram of a LAN system according to the present invention.

Referring to FIG. 11, the optical composite transceiver according to the present invention is used in the bus type LAN system using an optical fiber cable. One optical composite transceiver can connect a plurality of terminals, for example, four terminals, as shown in the figure. In this case, the terminal is connected to each of the coaxial transceivers by an AUI cable as well as by a conventional method.

Figure 12:
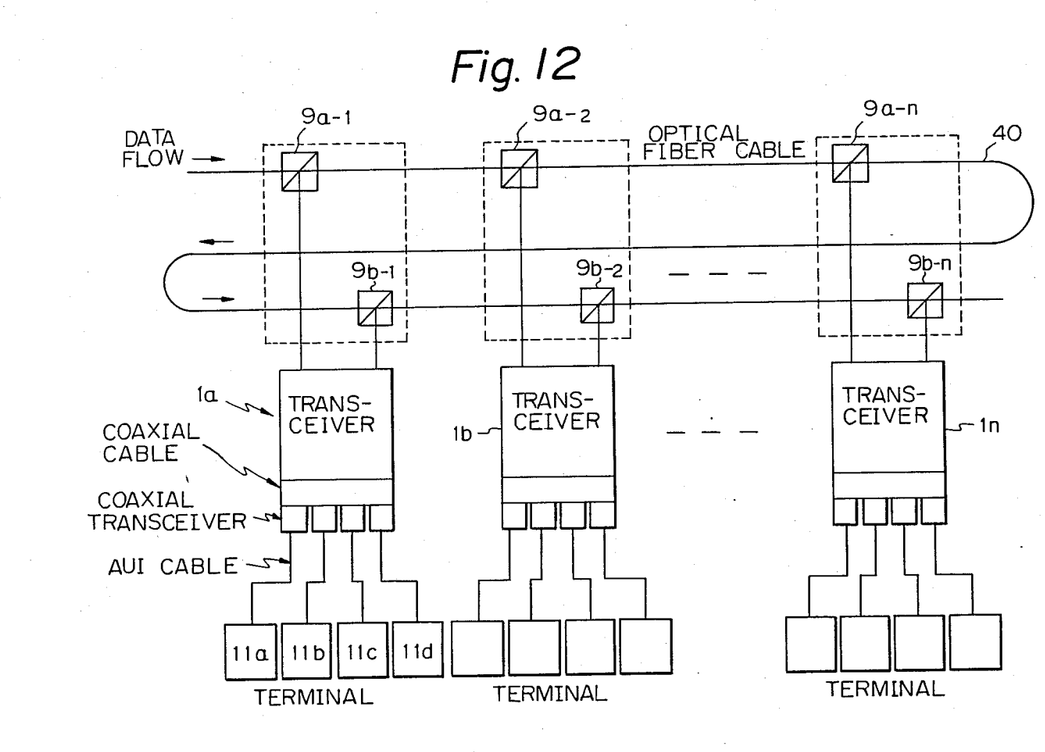
FIG. 12 is a schematic block diagram of a LAN system according to another embodiment of the present invention.

Referring to FIG. 12, the optical fiber cable 40 is provided with an S-shaped configuration. In this structure, after the sending data SD is sent on the optical fiber cable 10, the delay time for receiving the sending data SD in each terminal is the same among all terminals. Accordingly, it is possible to identify the collision detection timing on the optical fiber cable 40. In the U-shaped configuration explained in the first embodiment, since each receiving timing of the sending data SD is different in each terminal, it is necessary to adjust the timing in each terminal.

We claim:

1. An optical composite transceiver for a bus type local area network (LAN) system using a U-shaped or S-shaped optical fiber cable as a one-way transmission line and using a carrier sense multiple access/collision detection (CSMA/CD) method and a half duplex communication method, said optical composite transceiver comprising:
   first and second optical couplers, coupled to said optical fiber cable, sending and branching data to and from said optical fiber cable;
   conversion means, coupled to said first and second optical couplers, for converting electric signals into optical signals and optical signals into electric signals;
   an inner coaxial cable;
   a plurality of coaxial transceivers, connected to said inner coaxial cable, and detecting collision of frame data on said inner coaxial cable; and
   a control unit, coupled to said conversion means and one of said coaxial transceivers, having access functions for sending and receiving data and a collision detection function, collisions of frame data on said optical fiber cable being detected by said control unit, wherein when said control unit detects collisions of frame data on said optical fiber cable when data is transmitted, data received from the optical fiber cable is sent to the inner coaxial cable.

2. An optical composite transceiver for a bus type local area network (LAN) system using a U-shaped or S-shaped optical fiber cable as a one-way transmission line and using a carrier sense multiple access/collision detection (CSMA/CD) method and a half duplex communication method, said optical composite transceiver comprising:
   first and second optical couplers, coupled to said optical fiber cable, sending and branching data to and from said optical fiber cable;
   conversion means, coupled to said first and second optical couplers, for converting electric signals into optical signals and optical signals into electric signals;
   an inner coaxial cable;
   a plurality of coaxial transceivers, connected to said inner coaxial cable, and detecting collision of frame data on said inner coaxial cable; and
   a control unit, coupled to said conversion means and one of said coaxial transceivers, having access functions for sending and receiving data and a collision detection function, collisions of frame data on said optical fiber cable being detected by said control unit, wherein when said control unit does not detect collisions on the optical fiber cable based on the collision detection function when data is transmitted, sending of data received from the optical fiber cable to the coaxial cable is inhibited.

3. An optical composite transceiver for a bus type local area network (LAN) system using a U-shaped or S-shaped optical fiber cable as a one-way transmission line and using a carrier sense multiple access/collision detection (CSMA/CD) method and a half duplex communication method, said optical composite transceiver comprising:
   first and second optical couplers, coupled to said optical fiber cable, sending and branching data to and from said optical fiber cable;
   conversion means, coupled to said first and second optical couplers, for converting electric signals into optical signals and optical signals into electric signals;
   an inner coaxial cable;
   a plurality of coaxial transceivers, connected to said inner coaxial cable, and detecting collision of frame data on said inner coaxial cable; and
   control unit, coupled to said conversion means and one of said coaxial transceivers, having access functions for sending and receiving data and a collision detection function, collisions of frame data on said optical fiber cable being detected by said control unit, said control unit comprising:
      a coaxial cable collision detection module detecting a collision of frame data on said inner coaxial cable based on a change of potential of said inner coaxial cable; and
      an optical fiber cable collision detection module detecting a collision of frame data on said U-shaped or S-shaped optical fiber cable based on Manchester code rules.

* * * * *

UNITED STATES PATENT AND TRADEMARK OFFICE
CERTIFICATE OF CORRECTION

PATENT NO. : 4,809,361

DATED : February 28, 1989

INVENTOR(S) : Okada et al.

It is certified that error appears in the above-identified patent and that said Letters Patent is hereby corrected as shown below:

Col. 1, line 40, "with" should be --when--.

Col. 6, line 31, "c" should be --$\underline{c}$--;

line 36, "c" should be --$\underline{c}$--;

line 42, "b" should be --$\underline{b}$--;

line 47, "a" should be --$\underline{a}$--;

line 51, "d" should be --$\underline{d}$--.

Signed and Sealed this

Fourteenth Day of November, 1989

*Attest:*

JEFFREY M. SAMUELS

*Attesting Officer*     *Acting Commissioner of Patents and Trademarks*